US010383278B2

(12) United States Patent
Nelson et al.

(10) Patent No.: US 10,383,278 B2
(45) Date of Patent: Aug. 20, 2019

(54) AIRFLOW FOR AN AGRICULTURAL HARVESTING COMBINE

(71) Applicant: Tribine Industries LLC, Logansport, IN (US)

(72) Inventors: Darren J. Nelson, Hutchinson, KS (US); Robert A. Matousek, Valley Center, KS (US); Bryan S. Claerhout, Hesston, KS (US)

(73) Assignee: Tribine Industries LLC, Logansport, IN (US)

( * ) Notice: Subject to any disclaimer, the term of this patent is extended or adjusted under 35 U.S.C. 154(b) by 0 days.

(21) Appl. No.: 15/642,799

(22) Filed: Jul. 6, 2017

(65) Prior Publication Data

US 2018/0007830 A1 Jan. 11, 2018

Related U.S. Application Data

(60) Provisional application No. 62/358,629, filed on Jul. 6, 2016.

(51) Int. Cl.
*A01D 41/12* (2006.01)
*A01F 12/44* (2006.01)
(Continued)

(52) U.S. Cl.
CPC ............. *A01D 41/12* (2013.01); *A01D 41/02* (2013.01); *A01D 41/1252* (2013.01);
(Continued)

(58) Field of Classification Search
CPC .... A01D 41/12; A01D 41/1252; A01D 69/00;
A01D 41/02; A01B 76/00; B60K 11/04;
B60K 11/08; B60K 11/085; B60K 11/02;
B60K 13/02; F01P 5/02; F01P 5/06; F01P
11/12; F01P 11/10; F02M 35/044; F02M
35/022; F02M 35/06; F02M 35/164;
F02M 35/086; F02M 35/0216; F02M
35/0223; F04D 25/16; F04D 25/166;
A01F 12/444; A01F 12/446
(Continued)

(56) References Cited

U.S. PATENT DOCUMENTS 2,708,920 A * 5/1955 Pasturczak ............. F02M 35/06
123/198 E
3,786,891 A * 1/1974 Vogelaar ................ A01D 41/12
180/68.4
(Continued)

*Primary Examiner* — Robert E Pezzuto
(74) *Attorney, Agent, or Firm* — Mueller Law, LLC; Jerry K. Mueller

(57) ABSTRACT

An engine cooling system for an engine carried by a grain harvesting combine having an internal combustion engine and hot exhaust components, and having a front operator cab includes a generally horizontal fan assembly located atop the harvesting combine for drawing in air, a radiator associated with the engine and over which air flows for engine cooling, and charge air coolers for combustion air cooling, and air conditioning and hydraulic coolers, a centrifugal scroll that takes the drawn in air and removes entrained particles to produce a clean exhaust air and dirty exhaust air; and a filter assembly through which the pre-cleaned exhaust air flows for producing filtered air for admittance into the engine for combustion.

12 Claims, 14 Drawing Sheets

(51) Int. Cl.
    *B60K 11/02*     (2006.01)
    *A01D 41/02*     (2006.01)
    *B60K 13/02*     (2006.01)
    *F01P 5/02*     (2006.01)
    *F02M 35/022*     (2006.01)
    *F02M 35/02*     (2006.01)
    *F02B 73/00*     (2006.01)
    *F02M 35/024*     (2006.01)
    *B60K 5/08*     (2006.01)
    *B60K 13/04*     (2006.01)
    *B60K 11/04*     (2006.01)
    *B60K 11/06*     (2006.01)
    *F02M 31/20*     (2006.01)
    *A01D 41/06*     (2006.01)
    *B60K 15/03*     (2006.01)

(52) U.S. Cl.
    CPC .......... *A01F 12/444* (2013.01); *A01F 12/446* (2013.01); *B60K 5/08* (2013.01); *B60K 11/02* (2013.01); *B60K 11/04* (2013.01); *B60K 11/06* (2013.01); *B60K 13/02* (2013.01); *B60K 13/04* (2013.01); *F01P 5/02* (2013.01); *F02B 73/00* (2013.01); *F02M 35/024* (2013.01); *F02M 35/0216* (2013.01); *F02M 35/0223* (2013.01); *A01D 41/06* (2013.01); *A01D 41/1217* (2013.01); *B60K 15/03* (2013.01); *F02M 31/20* (2013.01)

(58) Field of Classification Search
    USPC ....... 55/345–347, 471, 467, 459.1; 180/68.1, 180/68.3, 68.2, 69.2; 296/203.02; 56/10.7
    See application file for complete search history.

(56) References Cited

U.S. PATENT DOCUMENTS

| | | | | |
|---|---|---|---|---|
| 6,202,777 | B1* | 3/2001 | Surridge | B60K 11/08 180/68.1 |
| 7,682,413 | B2* | 3/2010 | Sheidler | B01D 45/12 55/345 |
| 7,946,368 | B2* | 5/2011 | Vandike | F02M 35/164 180/68.1 |
| 8,256,551 | B2* | 9/2012 | Entriken | F01P 1/06 123/41.49 |
| 8,695,741 | B2* | 4/2014 | Schertz | F28F 27/00 123/41.49 |
| 10,104,829 | B2* | 10/2018 | Farley | A01B 76/00 |

* cited by examiner

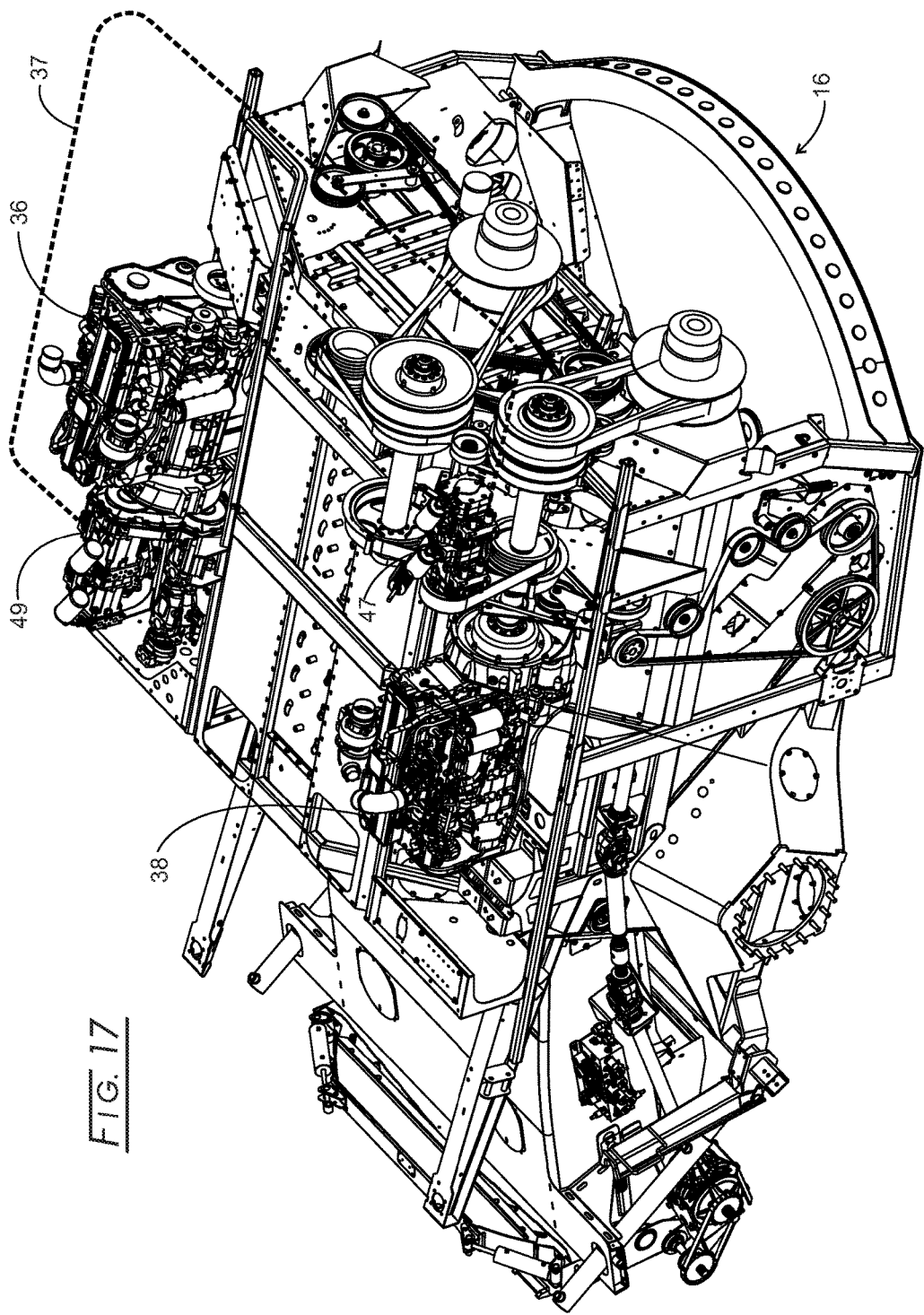

AIRFLOW FOR AN AGRICULTURAL HARVESTING COMBINE

CROSS-REFERENCE TO RELATED APPLICATIONS

This application claims benefit of provisional application Ser. No. 62/358,629 filed Jul. 6, 2016, and is cross-referenced to commonly owned application Ser. No. 16/643,685 (U.S. Publication 2018/0009305), filed on even date herewith and entitled "Dual Engine Agricultural Harvesting Combine".

STATEMENT REGARDING FEDERALLY SPONSORED RESEARCH

Not applicable.

BACKGROUND

The present disclosure relates to harvesting articulated (jointed) combines and more particularly to improved airflow in the forward tractor or crop processing power unit (PPU) having dual engines with all grain stored in a rear grain cart.

Most modern combines that utilize axially mounted threshing rotors have a single engine that is mounted transverse to the rotor (and direction of travel). Those combines typically use a bevel gear set to "turn" the engine's power to rotate the primary power consuming components—the rotor(s), header, and chopper(s). This configuration comes with several problems.

One problem is that axial combines with transverse mounted engines utilize an expensive, heavy, space, and energy consuming bevel gear set to "turn" the power needed for the rotor. Modern combines that package the engine parallel to the threshing cylinder, when the cylinder is mounted axially to the direction of travel, were developed to eliminate the bevel gear set. However, when a single engine is used and not mounted on the centerline of the machine, it generally causes a left-right weight imbalance, which is a second problem. This phenomenon is exasperated by the demand for higher horsepower combines that use larger (and heavier) diesel engines. Adding to the weight imbalance is the need for pump drive gearboxes in addition to the power takeoff. These gearboxes are typically mounted to the engine flywheel housing. They are heavy and expensive and typically contain one or more clutches that require hydraulic pressure and flow for actuation and lubrication.

A third problem is that crop residue that exits the combine is flammable and catches fire when it comes to rest on engine exhaust components. Combine combustion air pre-cleaning traditionally uses a collection of multiple "spin tubes" that separate dust from the combustion air prior to air filtration. The separated dust is generally evacuated from the pre-cleaner housing via a mechanically driven suction fan or exhaust venturi. Pre-cleaning is used to extend combustion air filter life. Crop debris, like soybean fuzz, is difficult to separate in the pre-cleaner, as that debris is relatively long and light compared to dust from dirt. Larger spin tubes have been designed with limited success. A fourth problem, then, is that combine filter life generally is poor due to inadequate pre-filter air cleaning.

Disclosed also is a combustion air pre-cleaner for a harvesting combine having a forward power processing unit (PPU) powered by an internal combustion engine and a rear grain cart for storage of harvested grain, and which combustion air pre-cleaner includes a cooling fan assembly located atop the PPU for drawing air in from atop the PPU for cooling of the internal combustion engine; and a scroll assembly that takes a portion of the air from the cooling fan assembly and separates solids therefrom and directs the separated air into the internal combustion engine.

Accordingly, an air handling, flow, and filtering system that addresses these and other issues is needed.

BRIEF SUMMARY

The disclosed harvesting combine forward unit carries two axially mounted engines with each undertaking different needed functions. The disclosed harvesting combine cooling package is mounted between the dual engines. The cooling package includes a stationary screen, a fan, two independent combustion air coolers (CAC), a radiator that is common to both engines with comingled coolant, a fuel cooler, an AC (air conditioner) condenser, and hydraulic oil cooler. A combustion pre-cleaning "scroll" is attached to the cooling package and is actively powered by screened fan air on the inlet and turbocharger suction on the outlet (via the air filter housing). The cleaning "scroll" separates the dirt from the air using centrifugal force and exhausts the dirt with a portion of the combustion air, resulting in cleaner air entering the filter housing.

A large capacity fan pulls clean air from the top of the combine forward unit and pushes it out through the rear water radiator and out onto the hot exhaust treatment system to keep all surfaces free of chaff/dust; and pushes air out through side-mounted charge air coolers and onto the hot exhaust manifolds of both engines to also keep them chaff free; pushes air out through front hydraulic cooler and forward and down into the cleaning charge air fan (located in a round ring that is in the middle of the hydraulic reservoir) that is forcing air downwardly and through plenums associated with sidesheets and bulkheads that direct the high pressure air downwardly until it reaches the upper rear portion of the cleaning fan, where it comingles with air drawn from in front of the fan. Coincident with the rear plenum bulkhead are louvers that bleed off some of this air and direct it through the wall and rearward along the side of the rotor (concaves) to effectively pre-clean the MOG from the grain shooting through the concaves by the rotor.

Perhaps, 5,000 cubic feet per minute (cfm) of cooling air comingled with about 5,000 to 10,000 cfm of ambient air from above the charge fan are transported down to the cleaning fan, which likely is asking for about 30,000 cfm of air. This design is want to do this because, if we allow the cleaning fan near the ground to pull all 30,000 from in front of the fan, it will likely pull a lot of residue off the ground (inlet vortices sweeping the soil) and plug the undersides of the sieves, which is a deleterious occurrence.

The air from the cleaning fan, then, is propelled rearward and upward, being squeezed by the clean grain conveyor surface, through the main (center, full length) sieves to carry away chaff from the sieves to enhance sieve capacity.

Disclosed, then, is cooling system for an engine carried by a grain harvesting combine having an internal combustion engine and hot exhaust components, and having a front operator cab. Such cooling system includes a generally horizontal fan assembly located atop the harvesting combine for drawing in air; a radiator associated with the engine and through which air flows for engine cooling; a centrifugal scroll pre-cleaner that takes the drawn in air and removes entrained particles to produce a clean exhaust air and a dirty exhaust; and a filter assembly through which the clean exhaust air flows for producing filtered air for admittance into the engine for combustion.

Disclosed also is a charge fan assembly located behind the forward operator cab and drawing air from about the top of the PPU and directing a portion of an air flow from the charge fan assembly downwardly into the cleaning fan assembly. The charge fan assembly also directs a portion of an air flow along the outside of the rotor and concaves assembly and another portion of an airflow down into the cleaning fan assembly. The charge fan assembly also draws away from the operator cab for additional cooling of the forward operator cab.

These and other features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 17 is an isometric view of the dual engines with the screened air inlet and cooling assembly removed to better see the dual engines.

The drawings will be described in greater detail below.

DETAILED DESCRIPTION

Referring initially to FIGS. 1, 2, 3, and 4, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015, U.S. Publication No. US 2017/0142901. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015, now U.S. Pat. No. 9,901,030.

Figure 1:
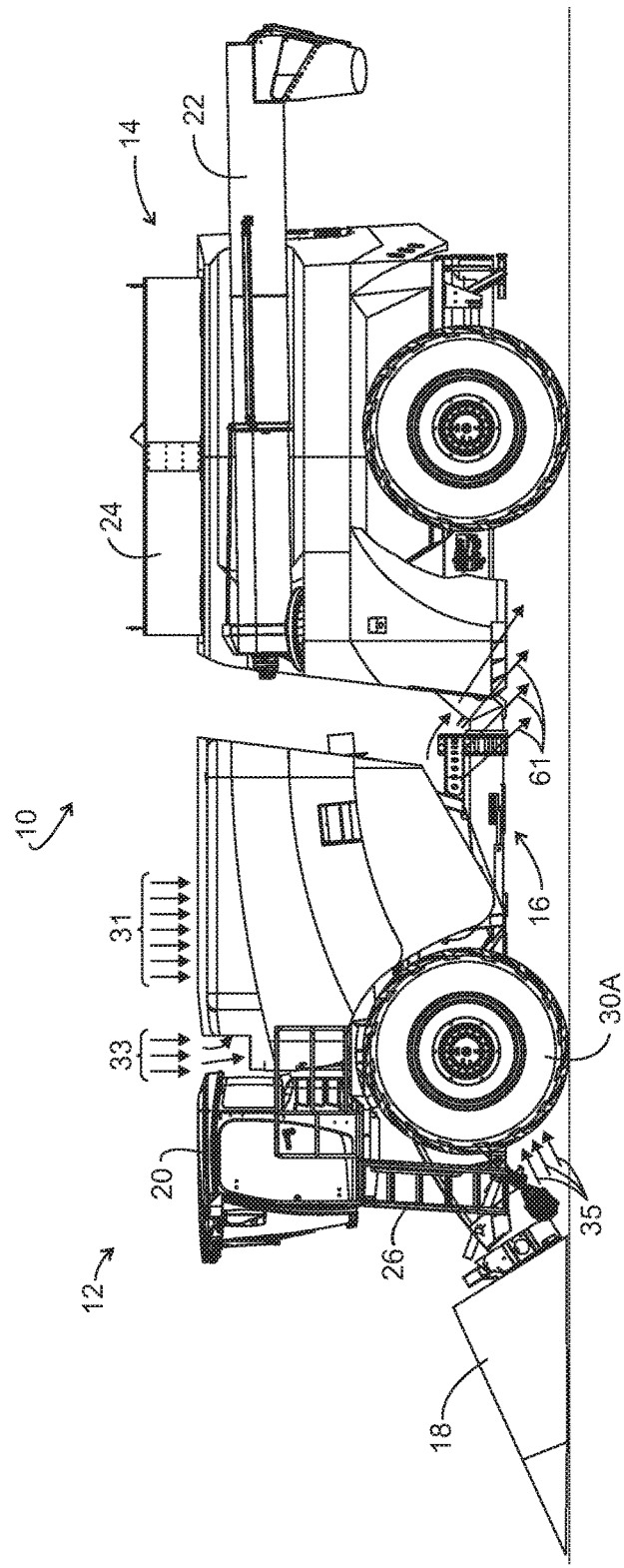
FIG. 1 is a side elevation view of the articulated combine of a forward tractor or crop processing power unit (PPU) and rear grain cart in which the grain is stored.
Figure 2:
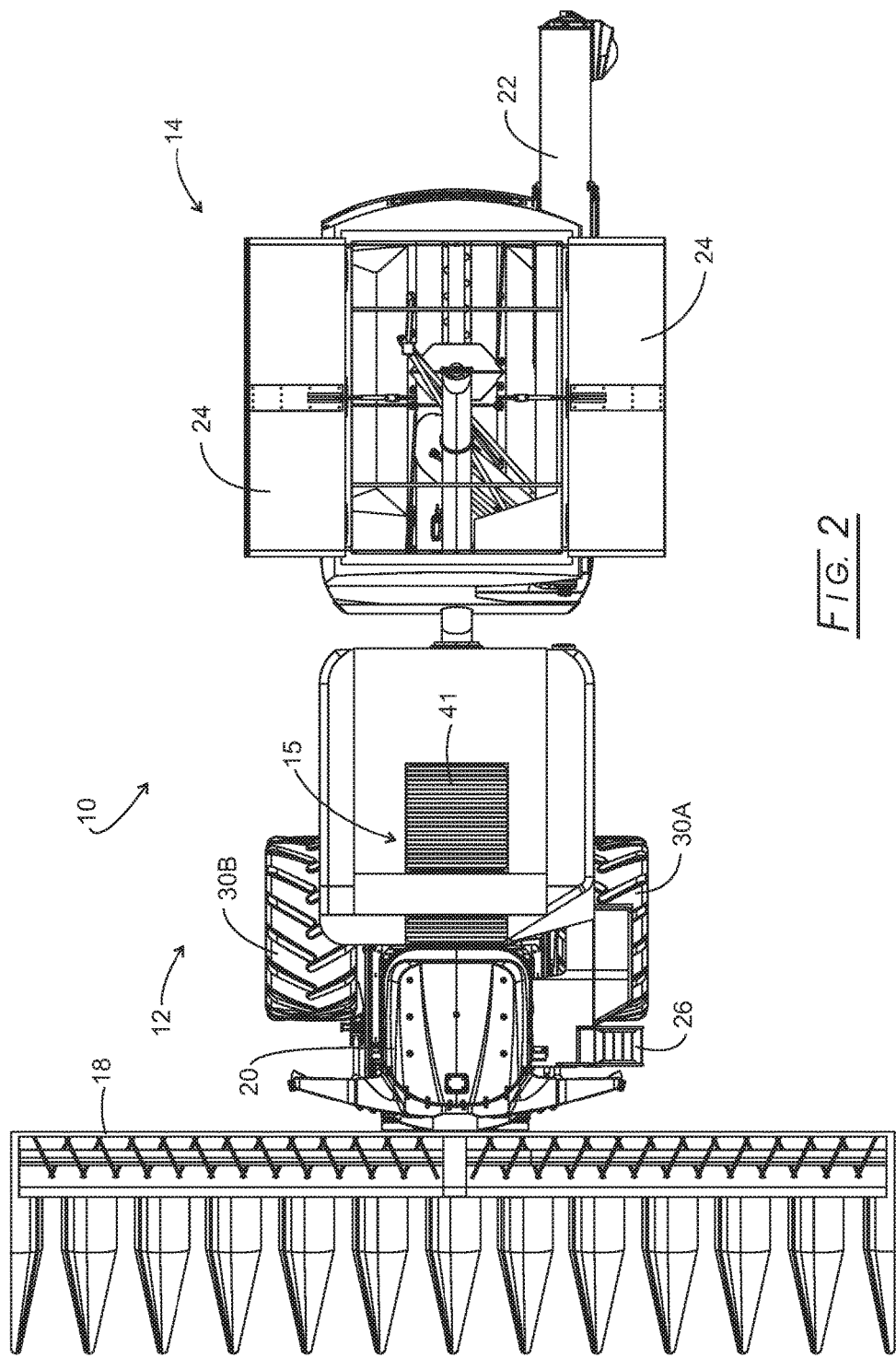
FIG. 2 is an overhead view of the articulated combine of FIG. 1.
Figure 3:
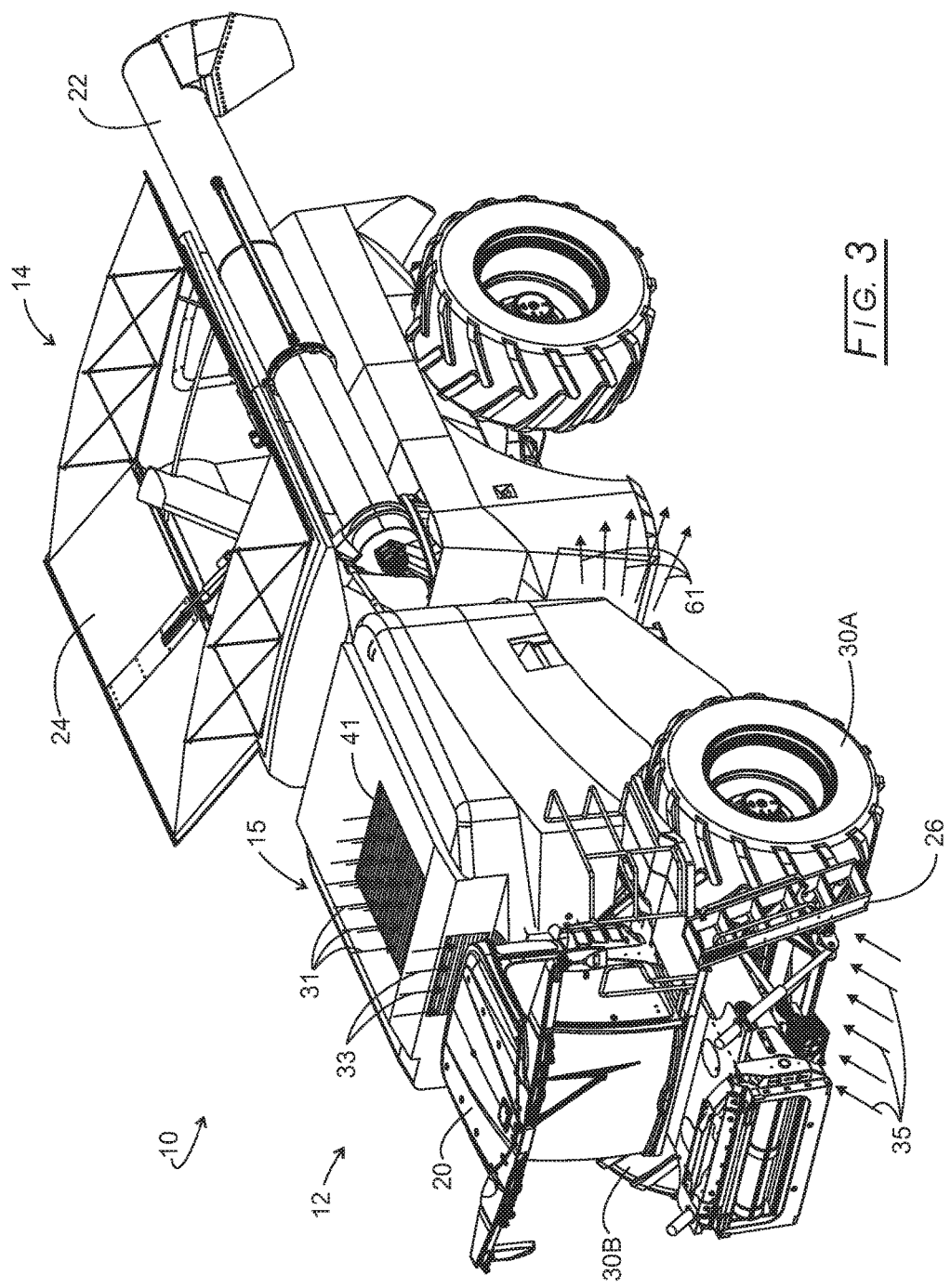
FIG. 3 is an isometric view of the articulated combine of FIG. 1.
Figure 4:
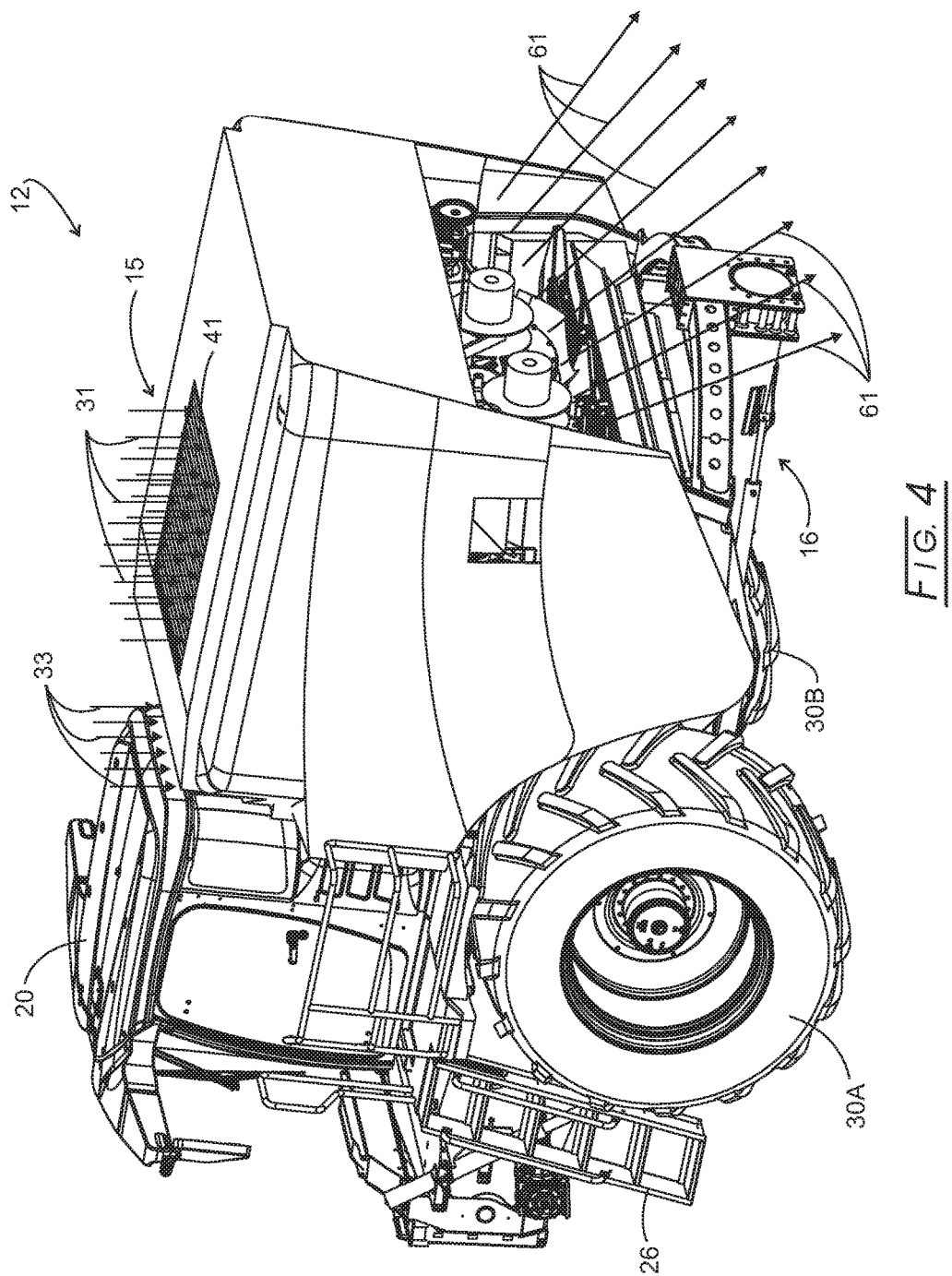
FIG. 4 is an isometric view of the PPU from the right rear side.

Referring now to FIGS. 3 and 4, the operator is granted access to cab 20 by a stair assembly, 26, that extends upwardly from just above the ground and will be more fully disclosed in commonly owned application Ser. No. 62/375,986, filed Aug. 17, 2016, U.S. Publication 2018/0051513, now abandoned.

Of interest for present purposes are the various locations and assemblies for admitting air into PPU 12 for a variety of purposes. Initially, air is admitted into PPU 12 fairly centrally atop PPU 12 as indicated by arrows 31. This location was chosen, as it arguably will be the cleanest flow of air around PPU 12. Various arrows will be used in this description to show the general direction and location of various major air flowpaths into PPU 12, within PPU 12, and exhausted from PPU 12. Additional airflow admittance into PPU 12 is from the top front thereof just behind cab 20, as indicated by arrows 33. A third major airflow path into PPU 12 is at the front bottom thereof between the PPU wheel/assemblies, 30A and 30B, as indicated by arrows 35. Most of the air from within PPU 12 will be exhausted from the rear thereof, as indicated by arrows 61. Fourth airflow paths are inlets at each of the two rear outer corners of cab 20 in front of the side styling panels and below the styling front hood.

Figure 5:
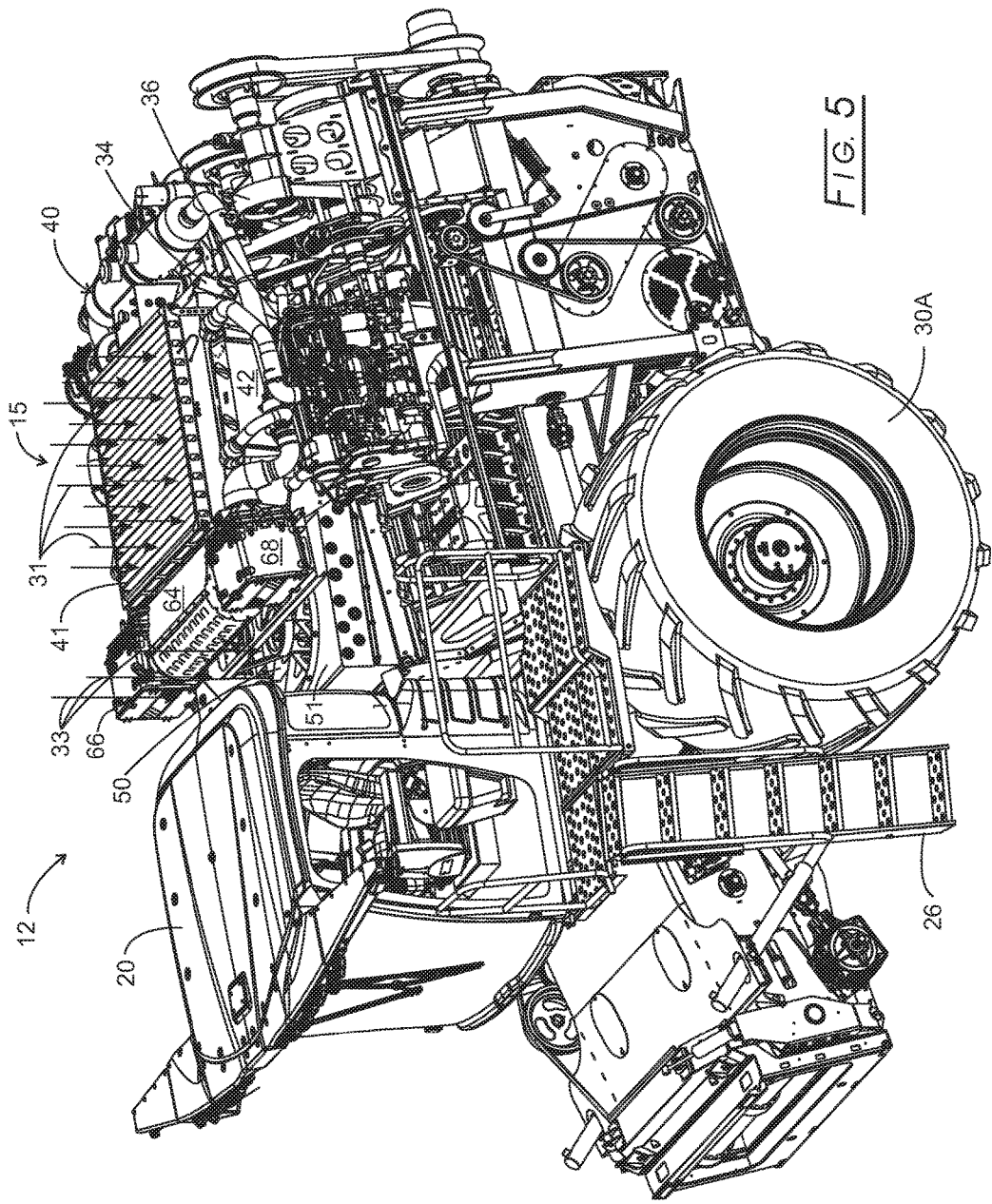
FIG. 5 is an isometric view of the PPU from the right front side with the skin or outer shell removed.
Figure 6:
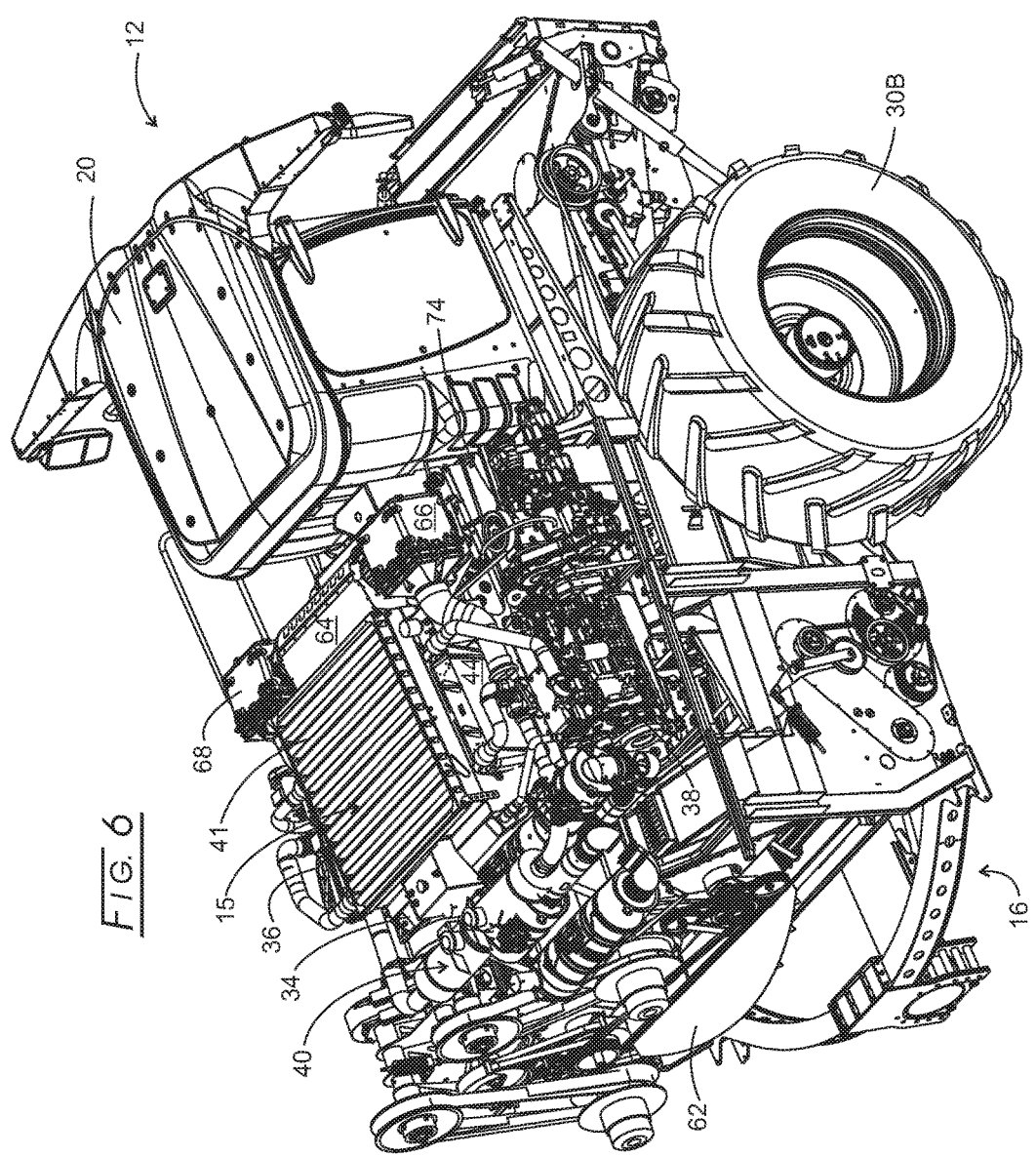
FIG. 6 is an isometric view from above of the PPU from the left rear with the skin or outer shell removed.
Figure 7:
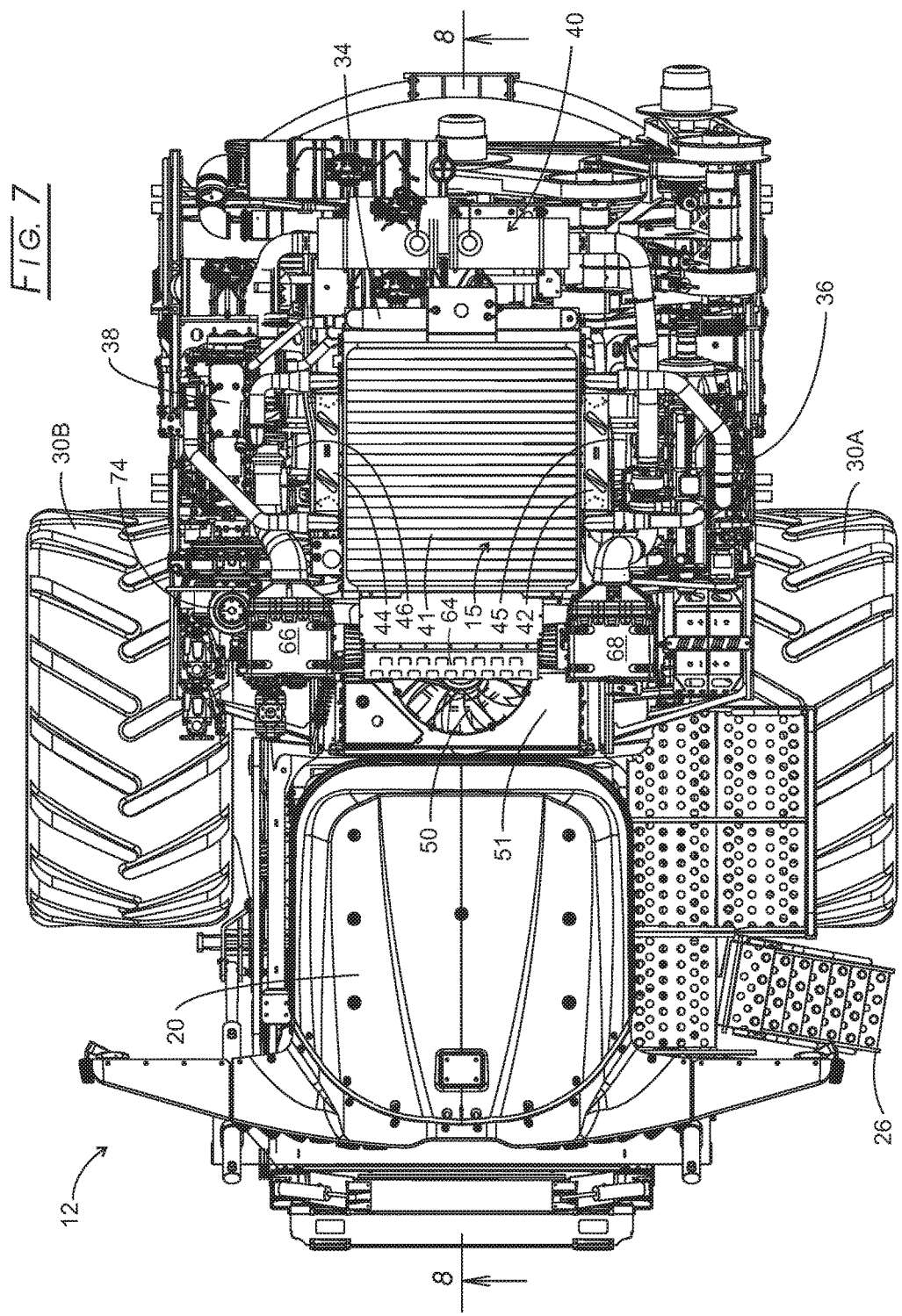
FIG. 7 is an overhead view of the PPU with the skin or outer shell removed.

The skin or shell has been removed in FIGS. 5-7 to reveal components housed within PPU 12. Airflow 31 enters atop PPU 12 through a grate, 41. This location was chosen, as it arguably will be the cleanest flow of air around PPU 12. Radiators, as typified by a radiator, 34 (FIG. 9), surround or cooling fan assembly 32 (FIG. 11) and are coolingly connected with a pair of engines, 36 and 38 (FIGS. 5 and 6, respectively) located on either side of main cooling fan assembly 32. A single air conditioning condenser, 43, sits adjacent to radiator 34 for cooling cab 20. Engine 38 powers the hydraulics and cooling functions/airflow movement for articulated combine 10, while engine 36 powers all other components of articulated combine 10. Exhaust after treatment assembly, 40, cleans air for emission control. When firing up the engines, which typically will be diesel engines (optionally supercharged), engine 38, which is clutched as startup, is started first so that coolant flowing through engine 38 will warm up engine 36 and the hydraulic fluid for articulated combine 10. The twin engines aspect will be described in detail in commonly owned application Ser. No. 15/643,685, filed on even date herewith.

Further on the dual engines for combine 10 is illustrated in FIG. 17, which has the cooling system removed. Initially, it will be observed that engine 38 faces forward, while engine 36 faces rearward. Such arrangement ensures that hot exhaust header and turbocharger face inwardly for both engines and adjacent the incoming top airflow and centrally located cooling assembly. Engine 38 is seen driving a variety of shafts, pulleys, and belts, which are attached to and drive hydraulic pumps, such as, for example, hydraulic pump, that drive the hydraulically driven systems of combine 10, as described herein and in the related applications cited herein. On occasion, the load on engine 38 will reach the capacity of engine 38, while the load on engine 36 is below its capacity, such as, for example, during unloading of grain from grain cart 14. Accordingly, a hydraulic line, 37, typically a 1" line, runs from a pair of hydraulic pumps, 47, and driven by engine 38, to a pair of hydraulic pump, 49, driven by engine 36. Hydraulic pumps 49 will add to the capacity of the hydraulics driven by engine 38 during times that such extra capacity is needed.

Figure 8:
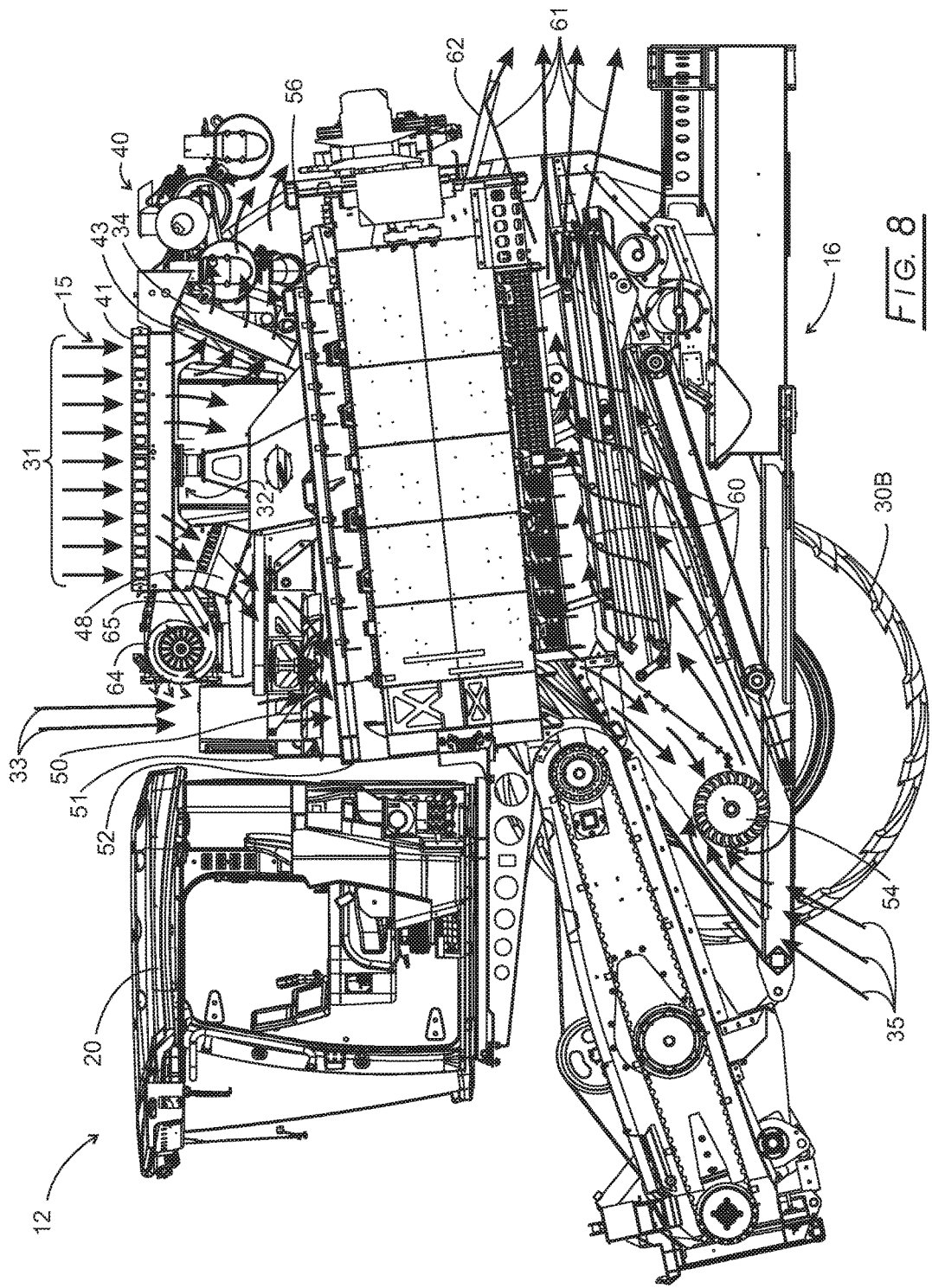
FIG. 8 is a sectional view taken along line 8-8 of FIG. 7.
Figure 9:
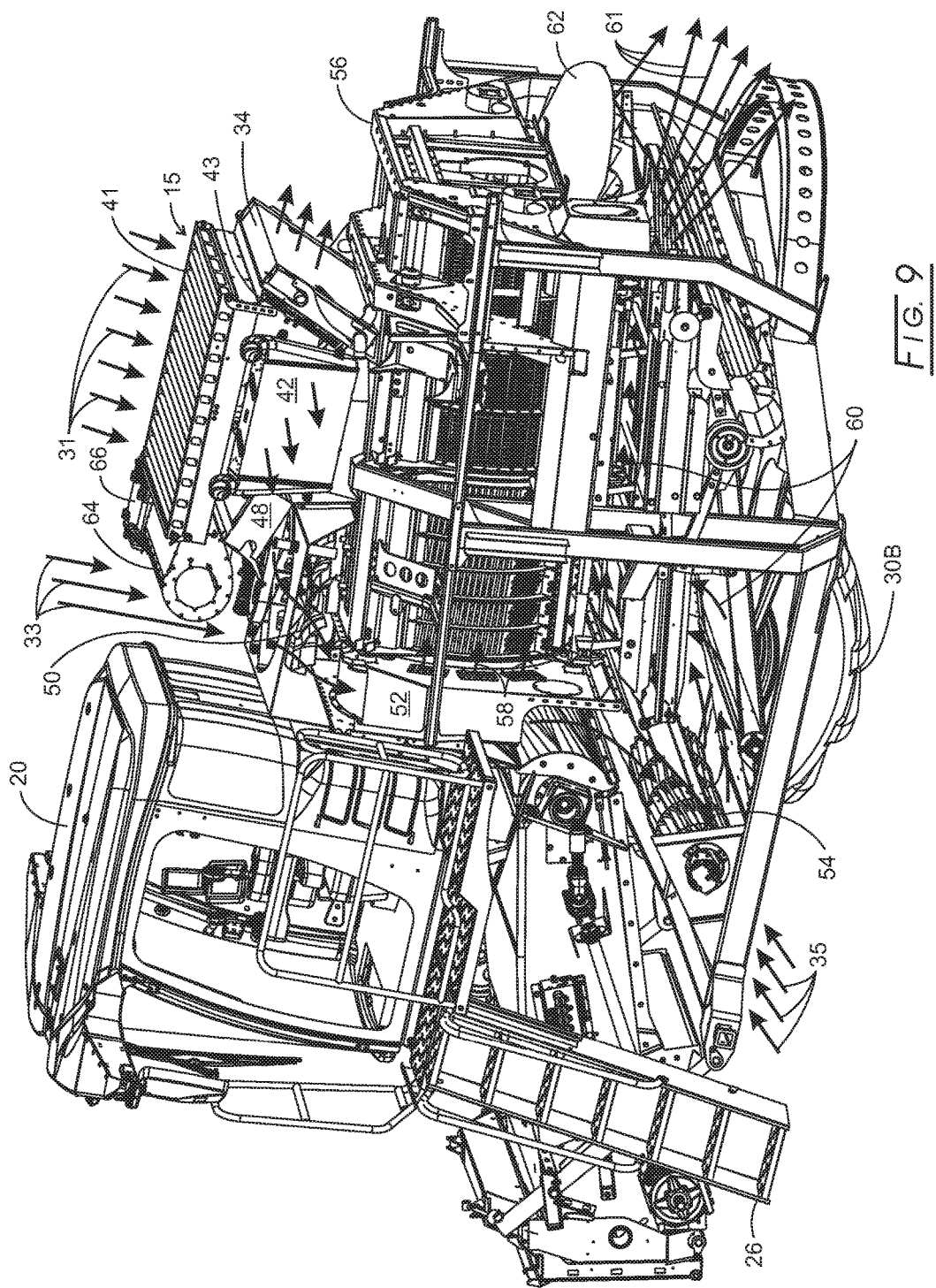
FIG. 9 is a right side isometric view of the PPU with the skin and left wheel/tire assembly removed.

Large capacity (cooling) fan assembly 32 (FIG. 11) that pulls clean air 31 from the top of PPU 12, pushes the air out through a rear water radiator 34 (FIG. 9), and out onto a hot exhaust treatment system, 40 (FIG. 5) to keep all surfaces free of chaff/dust and for cooling purposes; and pushes air out through side-mounted charge air coolers, 42 and 44 (FIGS. 5, 6 and 7, respectively) and onto the hot exhaust manifolds, 45 and 46 (FIG. 7, respectively) of both engines to also keep them chaff free; pushes air out through front hydraulic cooler, 48 (FIG. 8) and forward and down into the cleaning charge air fan, 50 (located in a round ring that is in the middle of the hydraulic reservoir, 51, FIG. 9) that is forcing air downwardly and through plenums associated with sidesheets surrounding the concaves (not shown) and a forward bulkhead, 52 (FIGS. 9 and 10) that direct the high pressure air downwardly until it reaches the upper rear portion of a cleaning fan assembly, 54 (FIGS. 8 and 9), where it comingles with air 35 drawn from in front of fan assembly 54. Coincident with a rear plenum bulkhead, 56 (FIGS. 8 and 9), are forward bulkhead 52 louvers (FIGS. 9 and 10) that bleed off some of this air, 58 (arrows in FIGS. 9 and 10), and direct it through the wall and rearward along the side of the rotor (concaves) to effectively pre-clean the MOG from the grain shooting through the concaves by the rotor. Fan blades of fan assembly 32 can be rotated, reversing the air flow, cleaning the radiation 34, condenser 43, coolers 42 and 44, and oil cooler 48, of debris.

Perhaps, about 5,000 to 10,000 cfm of cooling air comingled with about 5,000 to 10,000 cfm of ambient air from above charge fan 50 are transported down to cleaning fan assembly 54, which likely is asking for about 30,000 cfm of air. This design is want to do this because, if we allow cleaning fan assembly 54 near the ground to pull all 30,000 from in front of fan assembly 54, it will likely pull a lot of residue off the ground (inlet vortices sweeping the soil) and plug the undersides of the sieves, which is a deleterious occurrence.

The air from cleaning fan assembly 54, then, is propelled rearward and upward (see arrows 60 in FIGS. 8 and 10), being squeezed by the clean grain conveyor surface, through the main (center, full length) sieves to carry away chaff from the sieves to enhance sieve capacity. This air will track mostly straight rearward and will not comingle with the bonus sieve air.

Figure 15:
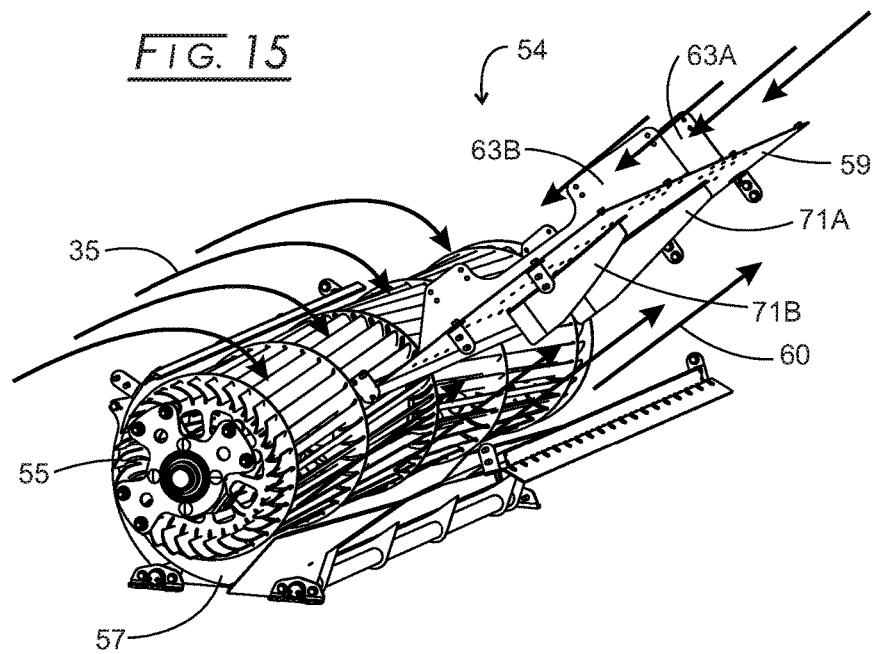
FIG. 15 is an isometric view of cleaning fan assembly.
Figure 16:
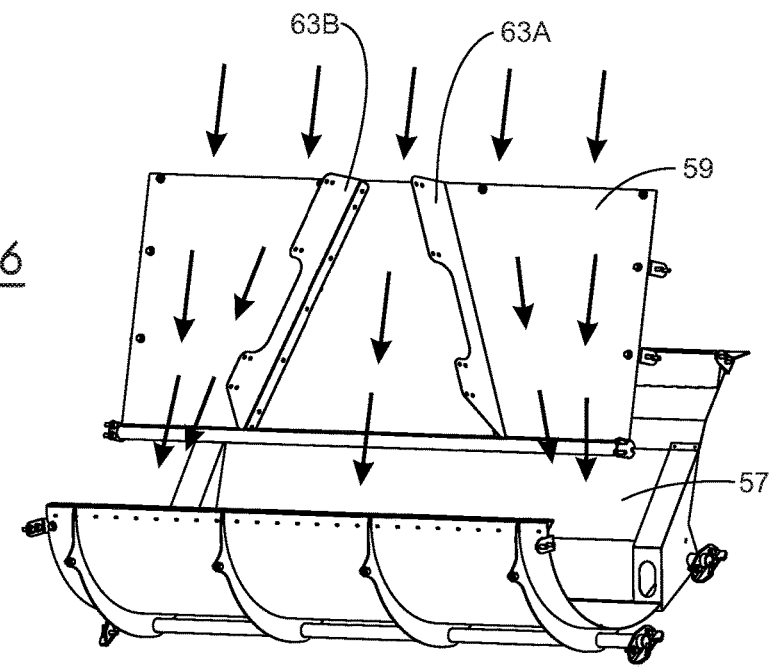
FIG. 16 is an isometric view of the cleaning fan assembly of FIG. 15 with the rotating fan itself removed to see the guide vanes on the divider plate.

Cleaning fan assembly 54 also is shown in further detail in FIGS. 15 and 16. In particular, elongate "squirrel cage" fan, 55, is carried by a cleaning fan housing, 57. An air guide vane, 59, is located rewardly thereof and has a pair of spaced apart, angled guide vanes, 63A and 63B, on its top surface and a pair of angled, spaced apart guide vanes, 71A and 71B. Elongate fan 55 tends to exhaust most of its air in its central portion with a low amount of air at its ends. The deflector plates direct an amount of air to the ends of clean fan assembly 54 to even out the air flow along its widthwise extent. Deflector plate 59 is adjustable, as air the deflector plates.

Figure 10:
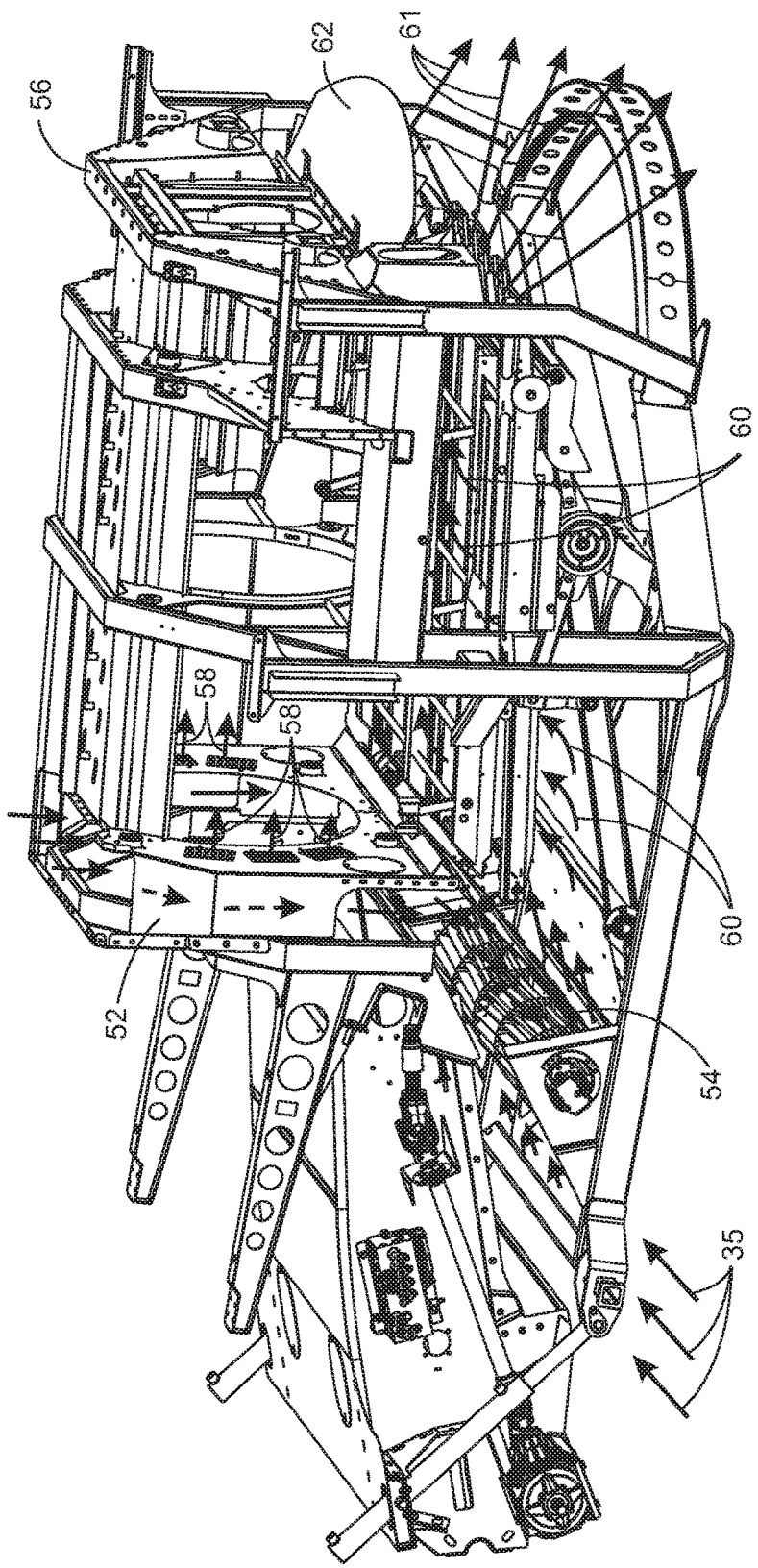
FIG. 10 is an isometric view of the chassis and frame assembly of the PPU.

FIG. 10 shows the chassis and frame assembly of PPU 12 along with various of the airflows described above. Also, note that an air deflector shield, 62, is located above exhaust air flow 61 at the rear of PPU 12 so that such dirty air does not rise above PPU 12 for re-admission thereinto. A description of the concaves and grates, and the chassis can be found in commonly-owned application Ser. No. 14/967,691, filed Dec. 14, 2015, now U.S. Pat. No. 9,820,442.

Figure 11:
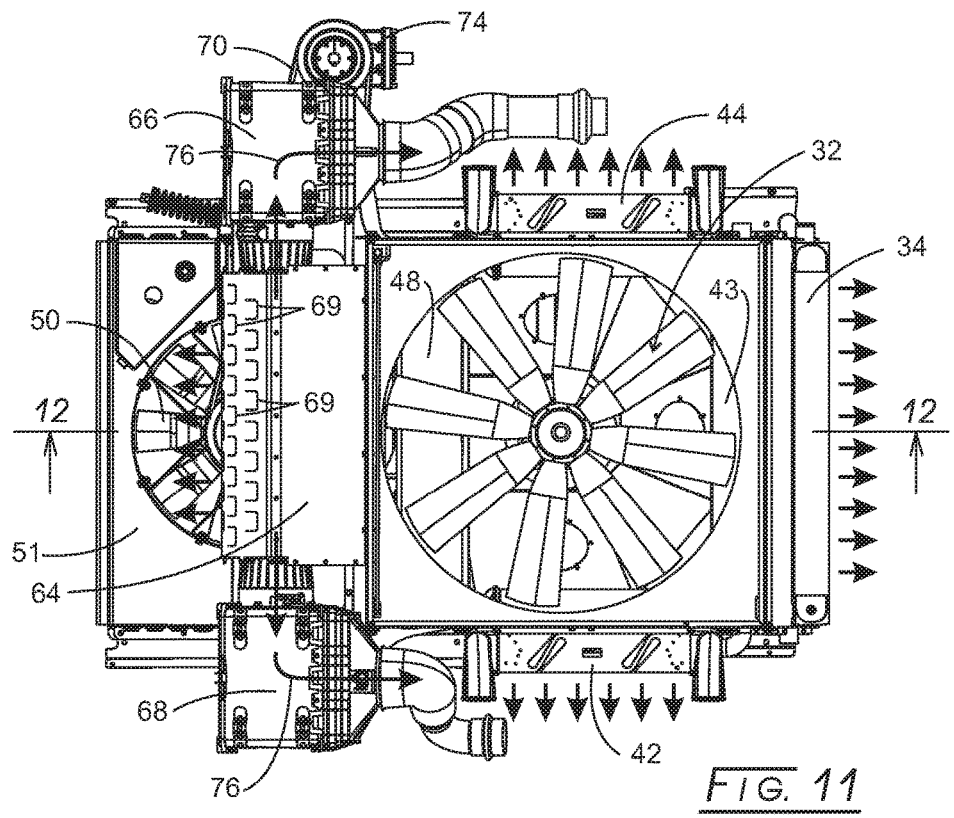
FIG. 11 is a top view of the PPU cooling package, including a stationary screen, a fan, two independent combustion air coolers (CAC), a radiator that is common to both engines with comingled coolant, a fuel cooler, an AC (air conditioner) condenser, and hydraulic oil cooler.
Figure 12:
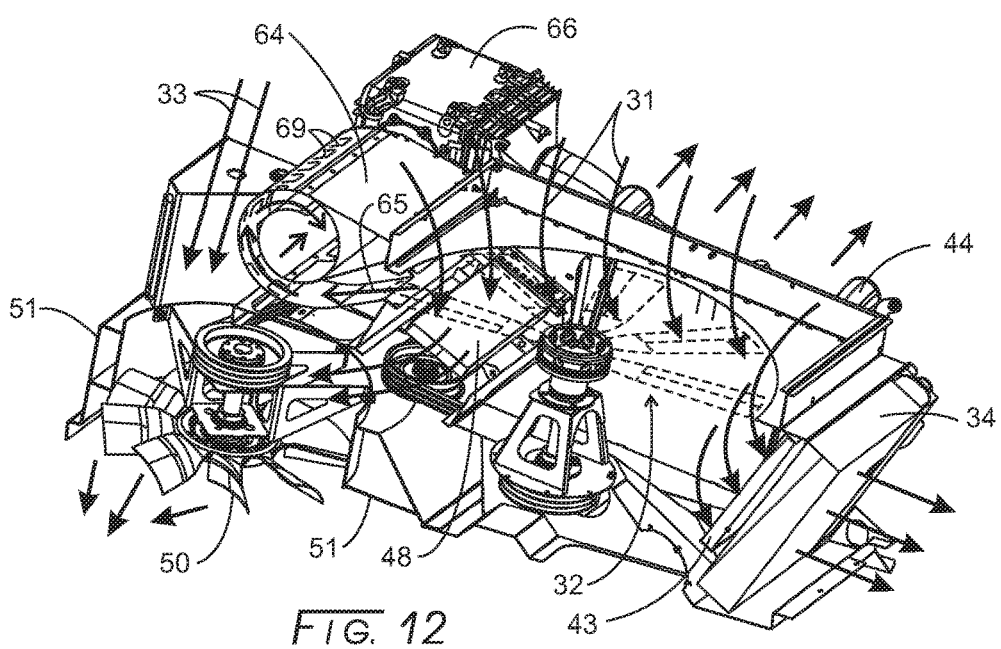
FIG. 12 is a sectional view taken along line 12-12 of FIG. 11.

Main fan assembly 32 is shown also in FIGS. 11 and 12, along with cleaning charge air fan 50. A cleaning "scroll" chamber, 64, separates dirt from air 65. Air 65 from fan assembly 32 enters scroll chamber 64 using centrifugal force and exhausts the dirt with a portion of the combustion air, resulting in cleaner air entering filter housings, 66 and 68, from which filtered air is sent to the turbochargers for the engines.

Figure 13:
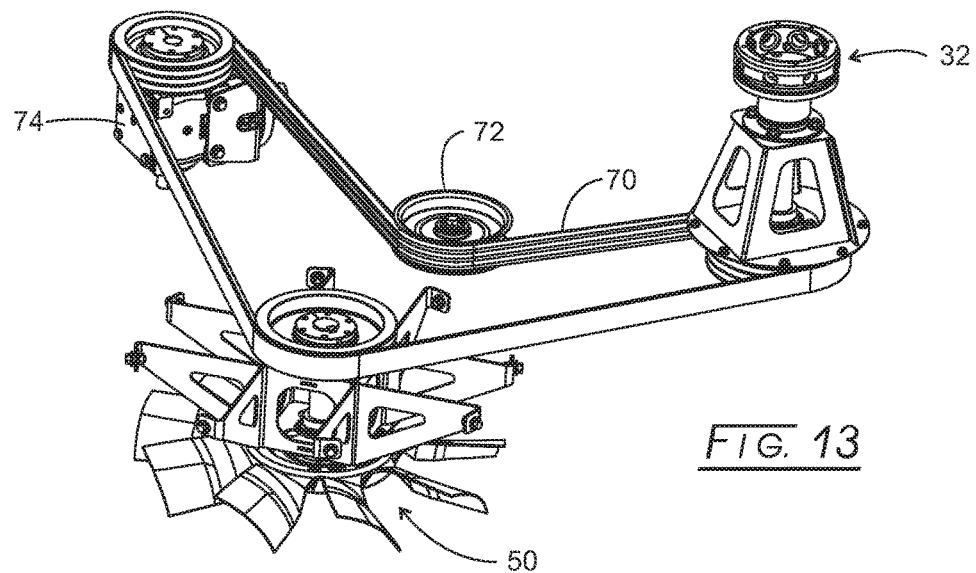
FIG. 13 is an isometric view of the belt assembly for the main overhead fan, gear box and cleaning charge air fan.
Figure 14:
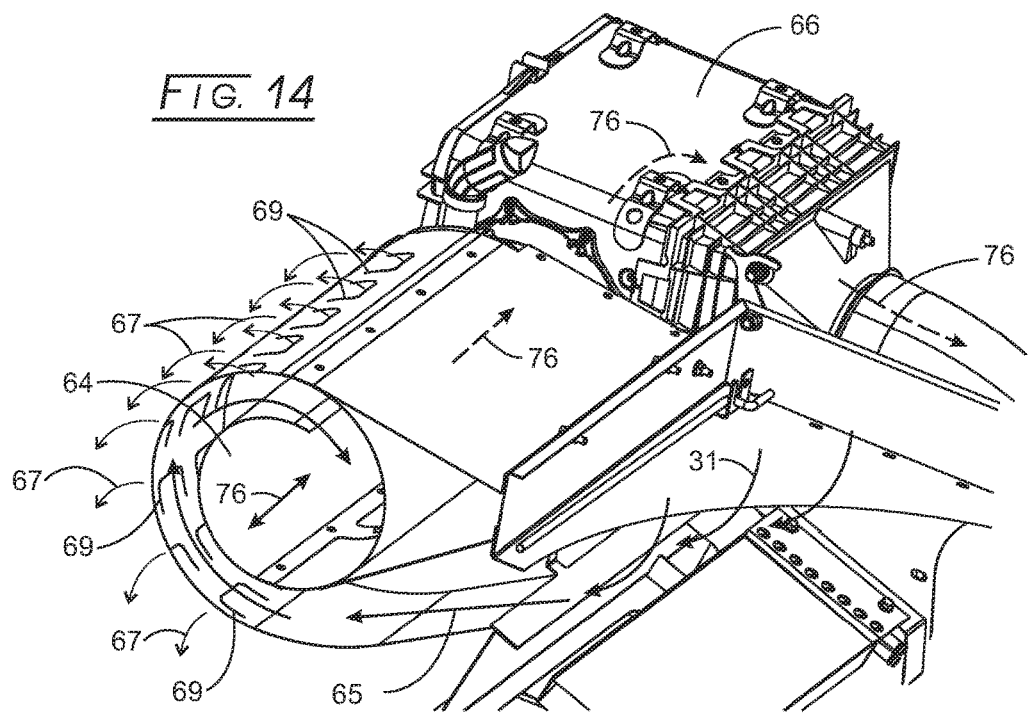
FIG. 14 is an isometric view of the combustion precleaning "scroll" that separates the dirt from the air using centrifugal force and exhausts the dirt with a portion of the combustion air, resulting in cleaner air entering the filter housing.

FIG. 13 shows a pulley system, 70, running around an idler, 72, a gearbox, 74, charge fan 50, and main fan assembly 32. FIG. 14 shows scroll chamber 64 and filter box 66 from which a filtered airflow, 76, flows to a turbocharger. It should be understood that louvers 69 in scroll chamber 64 let dirty airflow, 67, exit scroll chamber 64 and down into charge fan 50 for flow into forward bulkhead 52. Airflow from forward bulkhead 52, as described above, is for scavenging additional MOG and dirt from various surfaces as such scouring airflow runs towards the rear of PPU 12 for exhausting as indicated by airflow arrows 61 and for flowing down to cleaning fan assembly 54 again for scouring surfaces and carrying entrained particles (MOG and dirt) towards exhaust airflow 61. Such air cleaning system scheme feeds mainly clean, filtered air through the turbochargers and into the engines. Less clean and dirty air, then, is used for surface scouring and exhaustion of entrained particles.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A cooling system for an engine carried by a grain harvesting combine having an internal combustion engine and hot exhaust components, and having a front operator cab, which comprises:
   (a) a generally horizontal fan assembly located atop the harvesting combine for drawing in air;
   (b) a radiator associated with the engine and through which air flows for engine cooling;
   (c) a centrifugal scroll pre-cleaner that takes the drawn in air and removes entrained particles to produce a clean exhaust air and a dirty exhaust;
   (d) a filter assembly through which the clean exhaust air flows for producing filtered air for admittance into the engine for combustion; and
   (e) a pair of dual axially mounted engines with oppositely opposed crankshafts, wherein one engine powers hydraulics and the second engine powers mechanical grain harvesting combine components;
   wherein the engines share the radiator, and there is a separate air filter assembly for each engine.

2. The cooling system of claim 1, additionally comprising:
   (e) a cleaning charge air fan located adjacent to a hydraulic fluid reservoir and accepting the dirty exhaust air for distribution into the grain harvesting combine, the hydraulic fluid reservoir being cooled thereby.

3. The cooling system of claim 2, additionally comprising:
   (f) an air inlet located behind the operator cab in front of the generally horizontal fan assembly on an angled surface for feeding air to the cleaning charge air fan.

4. The cooling system of claim 1, wherein engine coolant is comingled for both engines and there is a single fuel cooler, air conditioning condenser, and hydraulic oil cooler for the engines.

5. The cooling system of claim 1, wherein engine coolant is comingled for both engines and there is a single fuel cooler, air conditioning condenser, and hydraulic oil cooler for the engines.

6. The cooling system of claim 1, additionally comprising:
   (e) a cleaning charge air fan located adjacent to a hydraulic fluid reservoir and accepting the dirty exhaust air for distribution into the grain harvesting combine, the hydraulic fluid reservoir being cooled thereby.

7. The cooling system of claim 6, additionally comprising:
   (f) an air inlet located behind the operator cab in front of the generally horizontal fan assembly on an angled surface for feeding air to the cleaning charge air fan.

8. A cooling system for an engine carried by a articulated grain harvesting combine of a forward crop processing power unit (PPU), a rear grain cart, and an articulation joint that connects the PPU with the rear grain cart, the articulated grain harvesting combine having an internal combustion engine and hot exhaust components, and having a front operator cab, which comprises:
   (a) a generally horizontal fan assembly located atop the harvesting combine for drawing in air;
   (b) a radiator associated with the engine and through which air flows for engine cooling;
   (c) a centrifugal scroll pre-cleaner that takes the drawn in air and removes entrained particles to produce a clean exhaust air and a dirty exhaust; and
   (d) a filter assembly through which the clean exhaust air flows for producing filtered air for admittance into the engine for combustion.

9. The cooling system of claim 8, additionally comprising:
   (e) a pair of dual axially mounted engines with oppositely opposed crankshafts, wherein one engine powers hydraulics and the second engine powers mechanical grain harvesting combine components;
   wherein the engines share the radiator, and there is a separate air filter assembly for each engine.

10. The cooling system of claim 9, wherein engine coolant is comingled for both engines and there is a single fuel cooler, air conditioning condenser, and hydraulic oil cooler for the engines.

11. The cooling system of claim 8, additionally comprising:
    (e) a cleaning charge air fan located adjacent to a hydraulic fluid reservoir and accepting the dirty exhaust air for distribution into the grain harvesting combine, the hydraulic fluid reservoir being cooled thereby.

12. The cooling system of claim 11, additionally comprising:
    (f) an air inlet located behind the operator cab in front of the generally horizontal fan assembly on an angled surface for feeding air to the cleaning charge air fan.

* * * * *